United States Patent Office 3,191,428
Patented June 29, 1965

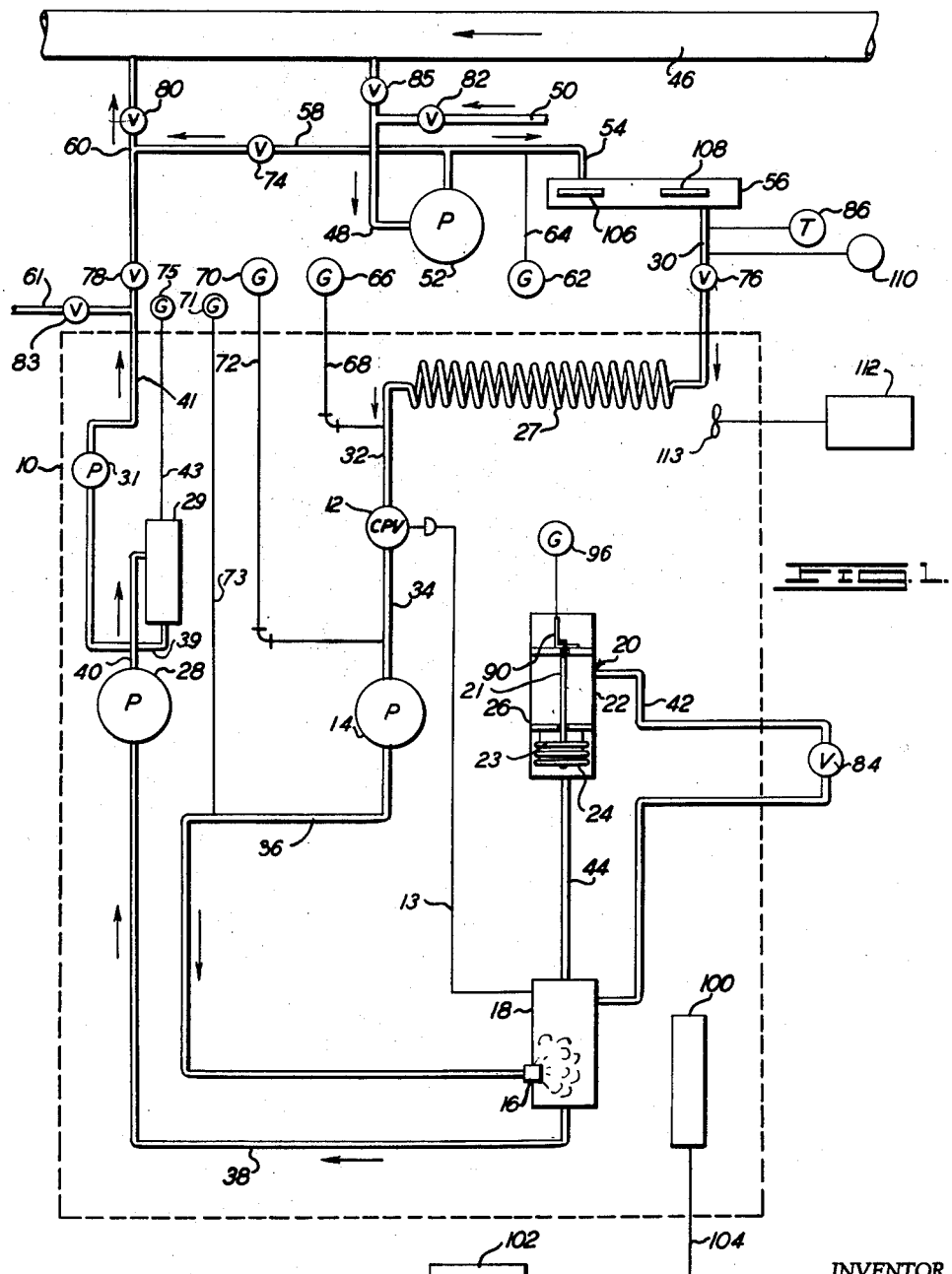

3,191,428
VAPOR PRESSURE MEASURING APPARATUS
John J. Piros, Homewood, Ill., assignor, by mesne assignments, to Sinclair Research, Inc., New York, N.Y., a corporation of Delaware
Filed Jan. 24, 1961, Ser. No. 84,556
5 Claims. (Cl. 73—53)

This invention relates to an improved apparatus for measuring the vapor pressure of a liquid such as gasoline and other normally liquid hydrocarbons. It is an apparatus that will determine the nature of a liquid by measuring its vapor pressure under controlled conditions, particularly of temperature and pressure. The invention can have means for continuously determining and recording the total vapor pressure and the fluctuations of such pressure where such pressure fluctuations are in magnitude but a small fraction of the average fluid pressure. The invention may also be adapted for use when the pressure fluctuations are large compared to the average pressure.

As is well known, vapor pressures of petroleum products are conventionally measured by the so-called "standard Reid test" as described in ASTM Code D323–43 which was originally devised in 1930. This is essentially a laboratory method which for maximum accuracy requires very careful manipulation as well as very careful sampling and refrigeration of samples during storage. The test gives reliable results only if the numerous procedural steps are carefully followed. Other methods have also been devised for measuring the vapor pressure of a blended gasoline wherein the vapor pressure is determined by measuring the temperature drop produced upon the expansion of liquid under test from a high to a low pressure under relatively adiabatic conditions. Still other methods have employed complicated apparatus designed to eliminate accumulation of fixed gases in the testing apparatus. While the foregoing methods provide reasonably accurate results they are comparatively slow procedures, requiring special facilities for taking samples of the gasoline stream and requiring refrigeration facilities for storage of the samples until they can be processed. Also, these methods are frequently overelaborate when it is desired merely to discover a slight change in vapor pressure and an indication of absolute vapor pressure is not needed.

The present invention provides an apparatus for facilitating quality control of liquids, for instance, gasoline and other hydrocarbon stocks, and for continuously and automatically determining the vapor pressure of liquid stocks of a relatively narrow boiling range. It provides a highly simplified means to control the quality of a blended gasoline which does not necessarily require the need for an extraneous liquid to provide reference pressure for the system.

These and other objects of my invention will be further described in connection with the following description taken together with the drawings in which:

FIGURE 1 is a schematic representation of the device; and

FIGURE 2 is a wiring diagram of the strain gauge bridge.

The apparatus of this invention comprises a vapor chamber associated with a bellows-unbonded strain gauge combination for determining the pressure developed in the vapor chamber, and means for supplying a liquid at a constant rate to the vapor chamber with substantially complete atomization or dispersal during admittance therein. The vapor pressure determining procedure is conducted at constant temperature.

An insulated tank 10 contains a thermostatic fluid such as water or preferably light oil. Essential elements of the vapor pressure measuring device contained in the tank are the constant differential pressure valve 12, the differential pressure control line 13, the sample supply pump 14, the atomizing nozzle 16, the vapor chamber 18 and the pressure sensing means 20, which may be, for example, a Statham Differential pressure transducer or a similar conventional device. The pressure sensing means preferably comprises a chamber divided into an upper compartment 22 and a lower compartment 24 containing a fluid tight bellows 23, the inside of which is in communication with the upper compartment 22 through a bore in the gasket 26 which is fixedly attached to the top side of the bellows and the walls of the chamber and which serves to define the compartments 22 and 24. The armature rod 21 is fixedly connected to the bottom side of the bellows and passes through the gasket 26 to the armature 90 located in the upper chamber. It will be observed that the bellows 23 is subjected to the pressure in compartment 24 on the outside thereof and to the pressure in compartment 22 on the inside thereof and that the deflection of the bellows is the result of the difference between the pressures in compartments 22 and 24.

Preferably the device of the invention also includes the temperature equalizing coil 27, the first exhaust pump 28, the collection tank 29 and the second exhaust pump 31, with their associated flow lines. The flow lines are the sample entrance line 30, the heated sample line 32, the pressurized sample line 34, the pumped sample line 36, the drain line 38, the collection tank drain line 39, the first exhaust line 40, the second exhaust line 41, a standard vapor line 42, and the test fluid line 44.

Associated elements outside the oil bath are the product line 46, the sample withdrawal line 48, a standard sample injection line 50, the auxiliary supply pump 52, the cool sample line 54, the preheating chamber 56, the relief line 58, the test sample return line 60, and the standard sample exhaust line 61. Pressure measurements in various parts of the system are made by the use of cool sample gauge 62, connected to line 54 by the pressure transmitting line 64, heated sample gauge 66 connected to line 32 by pressure transmitting line 68, pressurized sample pressure gauge 70 connected to pressurized sample line 34 by pressure transmitting line 72, sample pump discharge gauge 71 connected to pumped sample line 36 by pressure transmitting line 73 and collection tank pressure gauge 75 connected to collection tank 29 by line 43.

Fluid flow and pressure in the various lines are controlled in part by the relief valve 74 in relief line 58, check valve 76 in line 30, check valve 78 in line 41, check valve 80 in line 60, valve 82 in line 50, valve 84 which is preferably hand operable and outside the bath, but in the line 42, valve 83 in line 61, valve 85 in line 48. The invention may also be provided with the thermometer or thermocouple 86 in line 30.

The electrical elements used in the invention include unbonded strain gauge 90, the wires of which 91, 92, 93 and 95 make up a resistance element of the Wheatstone bridge 92 with the usual potential source at 94 and the galvanometer or other meter shown at 96 across the output 98—98 of the bridge; the bath heater 100, which can be, say a 250/500 Calrod heater inserted through the bottom of the bath and connected to the mercury thermoregulator 102 by lead or leads 104, the cartridge preheater 106 and the adjustable temperature switch 108 in the preheating chamber 56 and the pressure switch 110 in the sample entrance line 30. The tank 10 may be provided with the stirrer, such as a 2¾" impeller 113, driven vigorously by the motor 112.

The apparatus is designed to deliver liquid to the vaporizing chamber at a constant rate and subject the liquid, in finely dispersed form to a pressure drop in the chamber which causes vaporization of the liquid to a greater or less extent, depending of course, on its vapor pressure. To this end, the first exhaust pump 28, connected to the vaporizing chamber 18 through the drain line 38 has a capacity greater than the sample supply pump 14, to give a pressure drop in chamber 18 or a positive pressure differential between the inlet and drain lines sufficient to effect substantially constant delivery and atomization of the sample in the chamber 18. Both vaporized and unvaporized portions of the sample are carried away through the drain line 38 at a constant exhaust rate by the pump 28. The exhaust line from this first exhaust pump leads to a collection tank 29 which is maintained at a pressure substantially equal to the pressure in vaporizing chamber 18 to permit an essentially constant drain rate. Liquid in the tank 29 is then pumped through collection tank drain line 39 by the second exhaust pump 31 to the second exhaust line 41, with return of liquid to the product line 46 via line 60.

In the preferred embodiment, as stated, a fluid pressure transmitting means in the form of bellows 23 is employed. The outside of the bellows is conveniently exposed to the vapor pressure of the sample being tested and made sufficiently sensitive to respond to this pressure. It will be noted that the bellows 23 is axially movable, i.e. movable normal to the plane of the gasket, to be truly responsive to the fluid pressure imposed on it. The unbonded strain gauge 90 is in essence a Wheatstone bridge so arranged as to cause two wires of the bridge to be put under additional tension as the pressure in chamber 24 is increased. At the same time the remaining two wires are relaxed, thus causing an unbalance in the bridge resistance. The degree of change of resistance is directly proportional to the change in pressure between the sample chamber 24 and the reference chamber 22. The output of the bridge will be a variable direct current potential which is proportional to and in phase with the displacement of the bellows. The galvanometer 96 or other measuring and recording device will respond to the strain in the wires of the strain gauge resulting from the vapor pressure acting on the fluid pressure transmitting means.

The invention may conveniently be used to monitor the composition of the liquid flowing through line 46. As stated previously, the invention does not necessarily require an extraneous liquid to provide a reference pressure for the system. The control of, for example, a gasoline blend, may, with facility be effected with reference to its own vapor pressure. To use the apparatus in such a monitoring operation a sample of the liquid in the line 46 is taken through the withdrawal line 48 by the supply pump 52. Generally the pressure in the lines 46 and 50 is insufficient to maintain the sample in a pressurized state suitable for quick vaporization. The auxiliary supply pump 52 may preferably be a gear pump which moves the sample at a rate of about 30 liters per hour through the cool sample line 54 to the preheating chamber 56 which heats the sample up to within a degree or two of the bath temperature. This preheating chamber, as pointed out above, contains the cartridge heater 106 and a thermoswitch 108 which controls the electric current to this heater from a power source not shown. The preheating chamber 56 may conveniently be a short length of pipe, for example, half-inch pipe. The incoming sample flows through the annulus between the heater and the inside wall of the pipe. The pressure switch 110 is wired in series with heater 106 and is adjustable to interrupt the power to the heater in case the pressure drops due to a lack of liquid from the auxiliary supply pump. The thermometer 86 indicates the temperature of the liquid in the sample entrance line 30 and aids in adjusting the thermoswitch 108 to its proper control point.

The heated sample passes the check valve 76 and enters the temperature equalizing coil 27. This coil may comprise, for example, 15 feet of 3/8" O.D. copper tubing. By the time it reaches the heated sample line 32 the sample has attained the same temperature as the bath. The constant differential pressure valve 12 is governed by the pressure existing in the vaporizing chamber 18 through line 13 to give liquid in the line 34 a pressure differing by a fixed amount from the pressure of the vaporizing chamber. With a constant pressure at the inlet to pump 14, the pump will deliver liquid at a constant rate. The pump 14 may, for example, be a gear pump, such as a "Zenith" size 2, which may be driven for example at about 173 r.p.m. by a geared electric motor, and supply sample to the atomizing nozzle at the rate of about 12 liters per hour. This delivery rate is, of course, coordinated with the rate of pump 28 which may remove sample from the chamber 18 at, say, 18 liters per hour at the above-mentioned delivery rate.

A substantially constant and equal temperature is maintained in the various pieces of equipment located in the bath or tank 10 by use of, for example, a mercury relay to energize the heater 100.

The sample enters the vapor chamber 18 through a nozzle which may have about a 0.015" orifice and is substantially vaporized. During passage through the system of the standard sample, usually having the general physical and chemical characteristics as the material under test, valve 84 in the line 42 will be open to permit vapors of the standard sample to fill both compartments of the pressure sensing chamber 20. The bellows is subjected on both the inside and the outside to the vapor pressure of the standard sample when the recording device is being calibrated. In such a procedure the output of the strain gauge is adjusted and balanced to give a desired reference reading on the galvanometer 96 or other recording means.

After calibration of the recording device the valve 84 in line 42 closed, trapping a quantity of standard vapor in the chamber 22. After proper span adjustments are made which involve controlling the voltage input to the strain gauge the device will then automatically record or register changes in the vapor pressure of liquids passing through the line 46, i.e. the pressure differential between vapors in chamber 18 and the reference pressure. The device can continually withdraw test samples from the line 46, conducting them through the apparatus in the same manner as the standard sample. When the test sample is being measured only the area of the bellows exposed in chamber 24 will be imposed upon by the vapor pressure of the sample, this pressure being transmitted to chamber 24 through the conduit 44 leading from the vapor chamber 18. Quality control of the product stream in line 46 is effectively attained by referring its vapor pressure in chamber 24 to that of the standard sample vapor remaining in chamber 22. The bellows is actuated by the pressure exerted on the outside thereof which is in contact with chamber 24; that is, it is responsive to changes in the vapor pressure of the test sample in chamber 18, so that the deflection of the bellows represents changes in the pressure in said chamber.

The galvanometer 96 will measure the output occasioned by the displacement of the bellows under the influence of the pressure change in chamber 24. Thus a deviation in the blend composition will be reflected on the recording device and the operator may easily make the necessary adjustments in the blending controls to secure again the desired reference reading on the recording device.

In those instances where the device is to register the actual vapor pressure on the recording device, it is preferred that the standard sample chosen in the procedures outlined above be one whose vapor pressure is known under the conditions existing in the testing device. In one embodiment of this invention, therefore, provision is also made wherein means may be incorporated to provide a reference pressure from an extraneous liquid with a known vapor pressure to effect the registration of the actual vapor pressure of the gasoline blend on the recording device.

When an extraneous liquid is employed to provide a reference pressure in compartment 22, valve 85 in line 48 is closed and valve 82 in line 50 is opened to admit the liquid to the system. Also valve 78 in line 41 may be closed and valve 83 in line 61 may be open to expel extraneous liquid vapors from the system. After calibration of the indicator in such instances, the recording device will indicate the vapor pressure of the test sample in chamber 24 as a function of the vapor pressure of the standard sample in chamber 22. The apparatus of this invention is therefore ideally suitable for absolute vapor pressure determination applications, as well as for quality control functions. Of course when the standard sample chosen is an extraneous fluid rather than a gasoline blend that unvaporized portion that is expelled from the system passes through exhaust line 61 with valve 78 being closed.

Although the invention has been described with reference to a preferred embodiment thereof and for specific uses of such embodiment, it should be understood that these are by way of illustration only. In any event, modifications in the apparatus and in the techniques for using the apparatus will become apparent to those skilled in the art from the description and such can be made without departing from the spirit and scope of the invention.

It is claimed:

1. An apparatus for determining the vapor pressure of a liquid which comprises a pressure sensing chamber in association with a vaporizing chamber having liquid inlet and drain means, means for maintaining said pressure sensing chamber and said vaporizing chamber at constant temperature, a constant pressure valve and a sample supply pump for introducing liquid to the vaporizing chamber at a constant rate, an exhaust pump connected to said vaporizing chamber through said drain means for establishing a positive pressure differential between said inlet and said drain means of the vaporizing chamber, said pressure differential serving to atomize substantially completely the liquid introduced to said vaporizing chamber, fluid pressure lines in communication with the vapor phase existing in said vaporizing chamber leading to said pressure sensing chamber, and means operatively associated with said pressure sensing chamber for measuring the pressure differential between vapors in said vaporizing chamber and a reference pressure.

2. The device in claim 1 in which the pressure sensing chamber comprises two compartments separated by a rigid, fluid tight gasket, one side of said chamber containing a bellows attached to said gasket and exposed on the outside thereof to vapor pressure in said vapor chamber, and exposed on the inside thereof to the reference pressure.

3. The apparatus of claim 2 in which the means for measuring the vapor pressure differential includes an unbonded strain gauge responsive to movement of said bellows.

4. An apparatus for measuring fluctuations in the vapor pressure of a liquid which comprises a vaporizing chamber having drain means and an inlet means comprising a nozzle to substantially completely atomize liquid introduced to said vaporizing chamber, two pressure lines leading from a point in said vaporizing chamber in contact with the vapor phase to opposite sides of a bellows in a pressure sensing chamber, said pressure sensing chamber comprising two fluid tight compartments separated by said bellows, said bellows being movable in response to changes in pressure in either of said compartments and being connected to means for measuring said bellows movement, one of said fluid pressure lines having a valve for maintaining in one of said compartments a reference pressure derived from said vaporizing chamber and independent of later changes of pressure in said vaporizing chamber.

5. The apparatus of claim 4 in which the means for measuring the movement of the bellows is an unbonded strain gauge.

References Cited by the Examiner
UNITED STATES PATENTS

| | | | |
|---|---|---|---|
| 2,722,826 | 11/55 | Milligan et al. | 73—29 |
| 2,815,660 | 12/57 | Rhodes et al. | 73—53 |
| 2,858,400 | 10/58 | Statham | 73—398 X |
| 2,866,339 | 12/58 | Rhodes et al. | 73—407 |
| 2,979,955 | 4/61 | Shepler | 73—398 |
| 3,037,375 | 6/62 | Jacobs et al. | 73—29 X |

RICHARD C. QUEISSER, *Primary Examiner.*

C. A. CUTTING, DAVID SCHONBERG, *Examiners.*